Nov. 22, 1927. 1,649,868
H. A. T. STOAKES
GRASS CUTTING MACHINE
Filed July 1, 1925 2 Sheets-Sheet 2

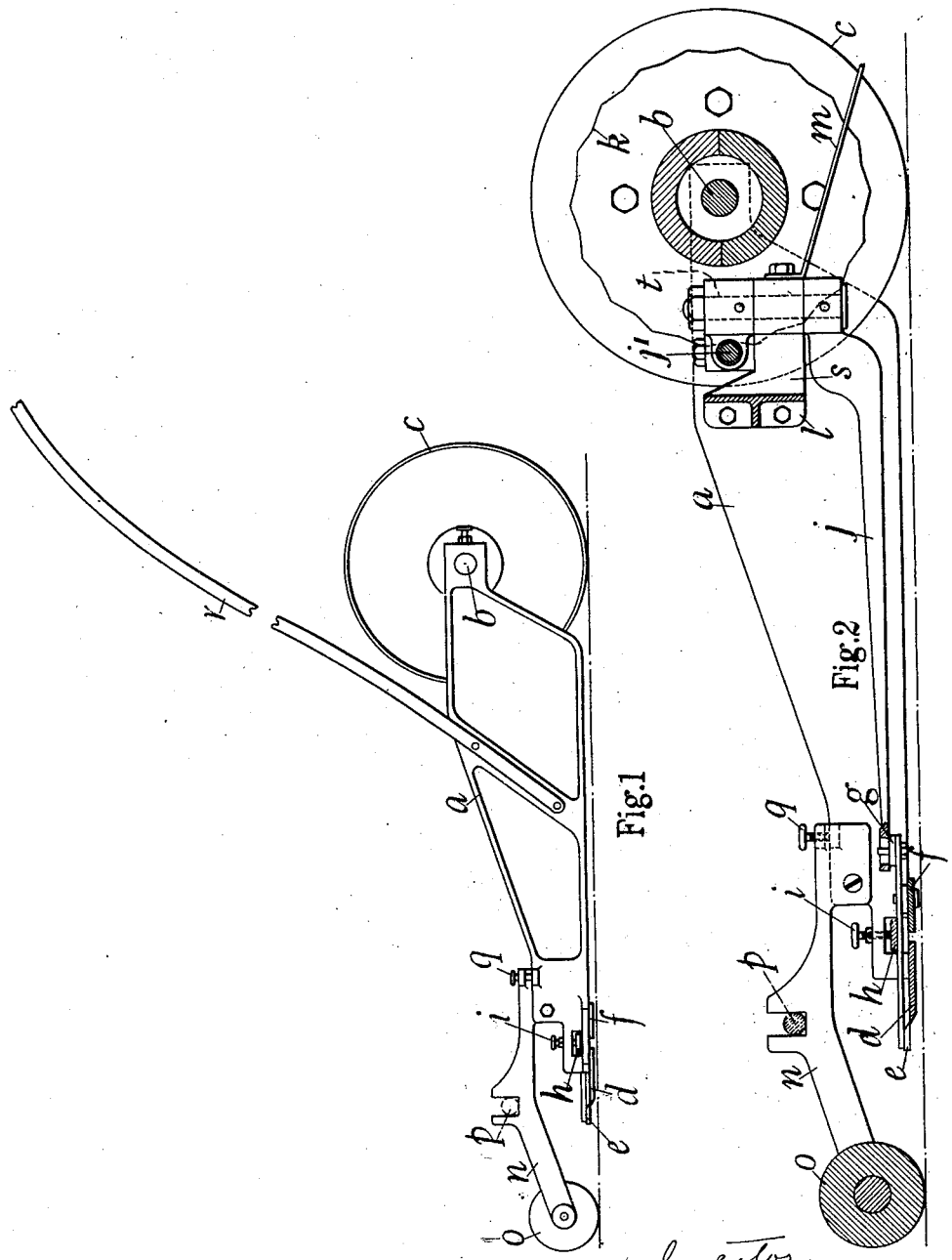

Inventor
H.A.T. Stoakes
By Marks & Clerk
attorneys

Patented Nov. 22, 1927.

1,649,868

UNITED STATES PATENT OFFICE.

HARRY ADRIAN TAYLOR STOAKES, OF CLAVERDON, NEAR WARWICK, ENGLAND.

GRASS-CUTTING MACHINE.

Application filed July 1, 1925, Serial No. 40,759½, and in Great Britain July 8, 1924.

This invention has for its object to construct an improved grass cutting machine suited more particularly to the mowing of lawns, the machine being of the type in which oscillatory blades are employed.

The invention comprises the employment in conjunction with a fixed horizontal blade presenting a front cutting edge of a plurality of T-shaped or like horizontal oscillatory blades adapted to co-operate with different portions of the front edge of the fixed blade for effecting the required cutting action.

Also the invention comprises the combination and arrangement of parts hereinafter described.

In the two accompanying sheets of explanatory drawings:—

Figure 1 is a side elevation illustrating diagrammatically a grass cutting machine constructed in accordance with this invention.

Figure 2 is a vertical section through the center of the machine on the line 2—2 of Fig. 3, and Figure 3 a plan to a larger scale than Figure 1 showing diagrammatically the grass cutting blades and the actuating mechanism.

Figure 3:
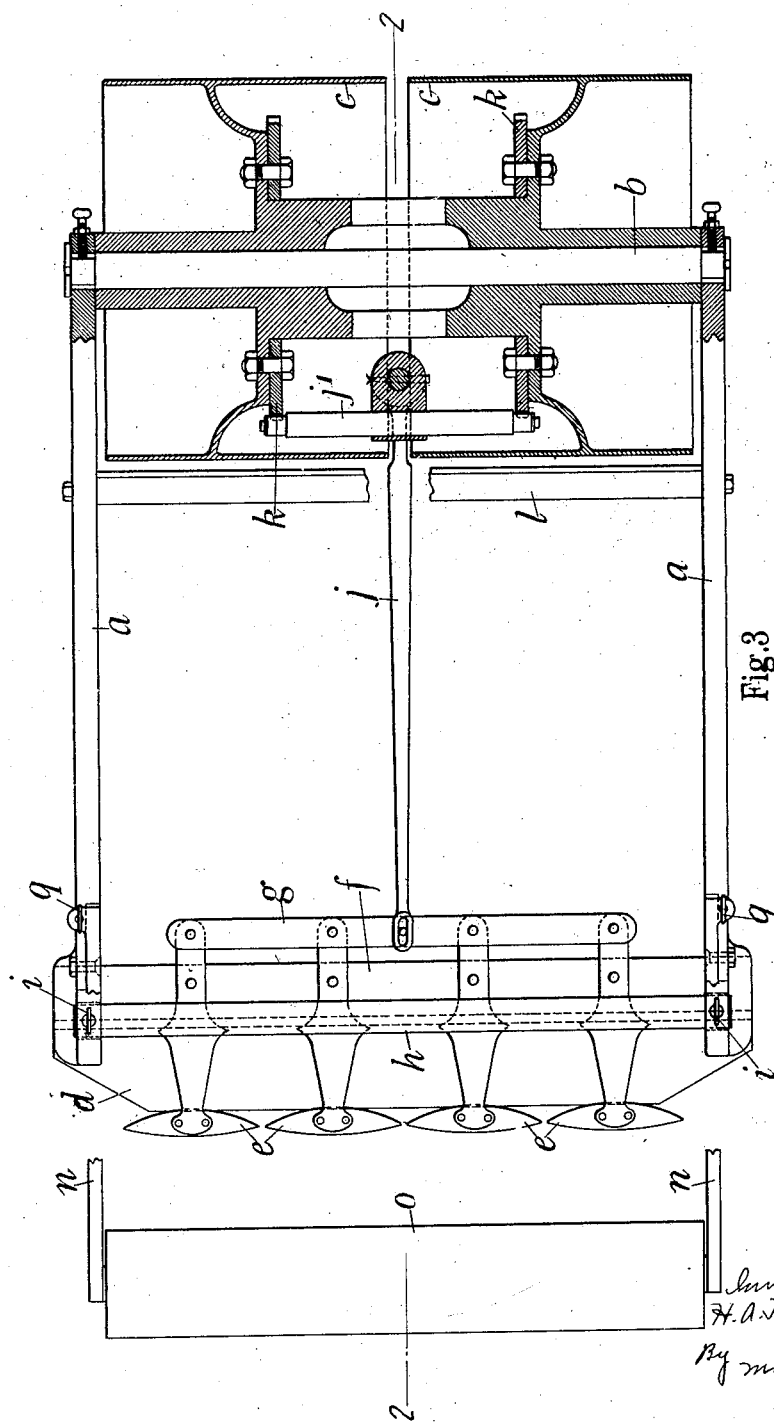

Referring to the drawings, a suitable framework or body part comprises a pair of side plates $a$ at the rear of which is mounted a spindle $b$ carrying a pair of coaxial driving drums $c$, which run in contact with the ground and serve to impart motion to the movable blade or blades. Transversely across the machine at its front end is arranged a fixed horizontal blade $d$ situated near the ground. The blade may have a straight front cutting edge, or a straight cutting edge with inclined end portions as shown, or the front cutting edge may be curved in any convenient manner.

In conjunction with the fixed blade above described are arranged a plurality of horizontal oscillatory blades $e$. Each is preferably made of T-like form, the inner or rear edges of the two sides of the head serving as cutting portions and the central shank as the means by which the blade is pivoted on the machine and operated. It is convenient to make the cutting portions of the blades $e$ separate from the shanks as shown in the drawings as this enables the blades to be renewed conveniently. Any suitable device may be used for detachably securing such blades to the shanks. The shanks are pivoted on a cross bar $f$. When moving in one direction relatively to the fixed blade the cutting is performed by the interaction of one side or edge of each oscillatory blade and the fixed blade, the other side or edge coming into action in the opposite or return movement. Each cutting edge of the movable blade is preferably curved, and the curvature is such that the angle between the fixed and moving cutting edges gradually diminishes from the initial to the final position, thus producing a cutting action analogous to that of a shears or scissors, and also that of a scythe.

The blades $e$ are connected at the outer ends of their shanks by a link $g$. The said blades may be held down in contact with the fixed blade by a transverse stretcher bar $h$ which is adjustable by screws $i$.

Oscillatory movements are imparted to the blades $e$ through a lever $j$ arranged between the side plates $a$ and attached at one end to the link $g$. At the other end the lever $j$ is fastened to a pin $t$ supported in a bracket 5 formed on a cross bar $l$. The pin $t$ carries lateral arms $j'$ arranged to co-operate with a pair of cams $k$ contained within the driving drums $c$ and provided with a number of peripheral projections and depressions, these being suitably disposed to give the required rapid oscillatory movement to the lever $j$. A scraper $m$ attached to the rear of the bracket is provided to keep clear from soil the gap between the driving rollers.

At the front of the frame is hinged an extension $n$ provided with a ground roller $o$. It is also preferably provided with any suitable arrangement of radial vanes (not shown) carried on the bearings $p$ and rotated in any convenient manner for sweeping the cut grass off the blades into a box carried on the side plates $a$. Adjustment of the fixed blade $d$ relatively to the ground is effected by altering the relationship between the frame plates $a$ and the extension $n$ by the screws $q$. Any suitable propelling or guiding handles $r$ may be attached to the machine. When required to be driven by mechanical power provision is made for attachment of a motor.

The invention is not limited to the above described means for oscillating the movable blades. Further the constructional details of the machine may be varied to suit different conditions or requirements.

Having thus described my invention what

I claim as new and desire to secure by Letters Patent is:—

1. In a grass cutting machine, the combination of a fixed horizontal blade presenting a front-cutting edge, a plurality of T-shaped, double acting oscillatory blades cooperating with different portions of the front edge of the fixed blade, and means for actuating the said oscillatory blades synchronously, substantially as described.

2. In a grass cutting machine, the combination with a fixed horizontal blade having a substantially straight front cutting edge, a plurality of oscillatory blades arranged side by side whereby during oscillation they co-act with the cutting edge throughout its entire length, and actuating means for the oscillatory blades.

In testimony whereof I have signed my name to this specification.

HARRY ADRIAN TAYLOR STOAKES.